United States Patent
Hirakata

(10) Patent No.: US 9,954,973 B2
(45) Date of Patent: Apr. 24, 2018

(54) DATA PROCESSING APPARATUS AND METHOD OF DATA PROCESSING FOR CONDITIONALLY PROVIDING SERVICE TO TERMINAL DEVICE

(71) Applicant: Satoru Hirakata, Kanagawa (JP)

(72) Inventor: Satoru Hirakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 14/710,727

(22) Filed: May 13, 2015

(65) Prior Publication Data
US 2015/0244832 A1    Aug. 27, 2015

Related U.S. Application Data

(63) Continuation of application No. 14/202,188, filed on Mar. 10, 2014, now Pat. No. 9,065,951.

(30) Foreign Application Priority Data

Mar. 15, 2013  (JP) ................... 2013-053913
Feb. 27, 2014  (JP) ................... 2014-037005

(51) Int. Cl.
*H04L 29/08* (2006.01)
*H04N 1/00* (2006.01)
(Continued)

(52) U.S. Cl.
CPC ............ *H04L 67/32* (2013.01); *G06F 3/1222* (2013.01); *G06F 3/1238* (2013.01);
(Continued)

(58) Field of Classification Search
CPC .......... H04W 4/02; H04L 67/18; H04L 67/02; H04L 67/32; H04N 1/00875;
(Continued)

(56) References Cited

U.S. PATENT DOCUMENTS 6,665,712 B2    12/2003  Pickup
7,756,530 B2    7/2010   Taniguchi et al.
(Continued)

FOREIGN PATENT DOCUMENTS

JP    2002-063008    2/2002
JP    2003-178084    6/2003
(Continued)

OTHER PUBLICATIONS

Office Action dated Dec. 5, 2017 issued with respect to the basic Japanese Patent Application No. 2014-037005.

*Primary Examiner* — King Poon
*Assistant Examiner* — Vincent Peren
(74) *Attorney, Agent, or Firm* — IPUSA, PLLC

(57) ABSTRACT

A data processing apparatus connected to a terminal device and providing a service in response to a request from the terminal device, includes a processable condition storing unit that stores one or more services providable by the data processing apparatus and a position of a terminal device to which provision of the service is permitted in correspondence with each of the services; a receiving unit that receives a service request of requesting provision of a service and positional information of the terminal device sent from the terminal device; and a control unit that controls the data processing apparatus to provide the service requested by the service request when the position indicated by the positional information received by the receiving unit is included in the position that is in correspondence with the service requested by the service request received by the receiving unit in the processable condition storing unit.

7 Claims, 16 Drawing Sheets

(51) Int. Cl.
  *G06F 3/12* (2006.01)
  *G06K 15/00* (2006.01)
  *H04N 1/44* (2006.01)

(52) U.S. Cl.
  CPC .......... *G06F 3/1285* (2013.01); *G06F 3/1292* (2013.01); *G06K 15/4095* (2013.01); *H04L 67/02* (2013.01); *H04N 1/00875* (2013.01); *H04N 1/4406* (2013.01)

(58) Field of Classification Search
  CPC ... H04N 1/4406; G06F 3/1222; G06F 3/1238; G06F 3/1285; G06F 3/1292; G06K 15/4095
  See application file for complete search history.

(56) References Cited

U.S. PATENT DOCUMENTS

| | | | |
|---|---|---|---|
| 8,191,156 | B2 | 5/2012 | Kubo |
| 8,786,875 | B1* | 7/2014 | Khafizova ............. G06F 3/1204 358/1.13 |
| 2001/0018349 | A1 | 8/2001 | Kinnunen et al. |
| 2001/0046067 | A1 | 11/2001 | Taniguchi |
| 2002/0040399 | A1 | 4/2002 | Nagashima |
| 2003/0151766 | A1* | 8/2003 | Clough ................. G06F 3/1222 358/1.15 |
| 2004/0137855 | A1 | 7/2004 | Wiley et al. |
| 2009/0011776 | A1 | 1/2009 | Taniguchi et al. |
| 2012/0019867 | A1* | 1/2012 | Prati ..................... G06F 3/1204 358/1.15 |
| 2013/0073625 | A1* | 3/2013 | Umetsu et al. .... G06Q 10/1095 709/204 |
| 2013/0212163 | A1 | 8/2013 | Shimomoto |
| 2013/0222840 | A1 | 8/2013 | Hosoda |
| 2013/0268624 | A1 | 10/2013 | Yagiura |
| 2014/0071488 | A1 | 3/2014 | Fukuda |

FOREIGN PATENT DOCUMENTS

| | | |
|---|---|---|
| JP | 2006-195884 | 7/2006 |
| JP | 2008-071043 | 3/2008 |
| JP | 2008-077530 | 4/2008 |
| JP | 2008-250930 | 10/2008 |
| JP | 2009-211431 | 9/2009 |
| JP | 2010-044454 | 2/2010 |
| JP | 2013-254404 | 12/2013 |

* cited by examiner

FIG.6

```
DeviceId    = uuid: defd8f20-c85c-11df-bd3b-0800200c9a66"
              <friendlyName>xxxxx/2.0</friendlyName>
              <manufacturerName>xxxx</manufacturerName>
              <modelName> serXXXXXXXXXXXXXXXX </modelName>
```

| USER ID | USER NAME | DEVICE ID | TERM OF VALIDITY OF ACCESS TICKET | ... |
|---|---|---|---|---|
| 1 | A | XXX-YYY-ZZZZ | N/A | ... |
| 2 | B | QQQ-WWW-EEE | 2013/3/10 | ... |
| 3 | C | AAAA-BBBB-CCC | N/A | ... |
| ... | ... | ... | ... | ... |

FIG.8

| SERVICE ID | COOPERATION PROCESSING SERVICE NAME | APPLIED USABLE CONDITION ID | 1091 |
|---|---|---|---|
| 1 | SCAN TO FOLDER | 1 | ... |
| 2 | SCAN TO MAIL | 2 | ... |
| 3 | FOLDER TO FAX | 1 | ... |
| 4 | FOLDER TO COLOR PRINT | 3 | ... |
| 5 | FOLDER TO MONOCHROME PRINT | 2 | ... |
| 6 | FOLDER TO PROJECTOR PROJECTION | 3 | ... |
| 7 | FILE BROWSING | 1 | ... |
| 8 | FILE OPERATION | 2 | ... |
| 9 | DATA DOWNLOAD | 5 | ... |
| 10 | DATA UPLOAD | 4 | ... |

FIG.9

| USABLE CONDITION ID | USABLE CONDITION | /1101 |
|---|---|---|
| 1 | USABLE FROM ANY SITE | ... |
| 2 | ONLY USABLE FROM OWN COMPANY SITE | ... |
| 3 | ONLY USABLE FROM OTHER COMPANY SITE | ... |
| 4 | ONLY USABLE FROM DESIGNATED SITE | ... |
| 5 | ONLY USABLE FROM SAME SITE | ... |
| 6 | ONLY USABLE FROM DIFFERENT SITE | ... |
| 7 | UNUSABLE FROM ANY SITE | ... |
| ... | ... | ... |

FIG.10

| SITE ID | SITE NAME | OWN/ OTHER CO. FLAG | DESIGNATED SITE FLAG | EAST END | WEST END | SOUTH END | NORTH END |
|---|---|---|---|---|---|---|---|
| 1 | OFFICE A | OWN | DESIGNATED | 139.603000 | 139.600000 | 35.503000 | 35.500000 |
| 2 | OFFICE B | OWN | DESIGNATED | — | — | — | — |
| 3 | OFFICE C | OWN | N/A | — | — | — | — |
| 4 | OFFICE D | OWN | DESIGNATED | — | — | — | — |
| 5 | BUSINESS CONNECTION COMPANY A | OTHER | N/A | — | — | — | — |
| 6 | BUSINESS CONNECTION COMPANY B | OTHER | DESIGNATED | — | — | — | — |
| ... | ... | ... | ... | ... | ... | ... | ... |

| OUTPUT DEVICE ID | OUTPUT DEVICE NAME | OUTPUT DEVICE PROVIDED SITE NAME | 1151 |
|---|---|---|---|
| 1 | MFP_A | OFFICE A | ... |
| 2 | MFP_B | OFFICE B | ... |
| 3 | MFP_C | OFFICE C | ... |
| 4 | PROJECTOR A | OFFICE A | ... |
| 5 | PROJECTOR B | BUSINESS CONNECTION COMPANY A | ... |
| 6 | PROJECTOR C | BUSINESS CONNECTION COMPANY B | ... |
| ... | ... | ... | ... |

FIG.16

| USABLE CONDITION ID | REQUEST SOURCE CONDITION | OUTPUT DESTINATION CONDITION | USABLE /UNUSABLE | ~1101 |
|---|---|---|---|---|
| 1 | ANY SITE | MFP_A | USABLE | ... |
| 2 | ANY SITE | MFP_B | USABLE | ... |
| 3 | OWN COMPANY SITE | DEVICE IN OWN COMPANY SITE | USABLE | ... |
| 4 | OWN COMPANY SITE | PROJECTOR A | UNUSABLE | ... |
| 5 | OWN COMPANY SITE | PROJECTOR B | USABLE | ... |
| 6 | OTHER COMPANY SITE | MFP_B | USABLE | ... |
| 7 | DESIGNATED SITE | MFP_C | USABLE | ... |
| 8 | SAME SITE | ANY DEVICE | USABLE | ... |
| 9 | DIFFERENT SITE | MFP_A | USABLE | ... |
| 10 | ANY SITE | ANY DEVICE | UNUSABLE | ... |
| ... | ... | ... | ... | ... |

DATA PROCESSING APPARATUS AND METHOD OF DATA PROCESSING FOR CONDITIONALLY PROVIDING SERVICE TO TERMINAL DEVICE

CROSS-REFERENCE TO RELATED APPLICATIONS

This application is a continuation application of U.S. patent application Ser. No. 14/202,188 filed on Mar. 10, 2014, which claims the benefit of priority of Japanese Priority Applications No. 2013-53913 filed on Mar. 15, 2013, and No. 2014-37005 filed on Feb. 27, 2014, the entire contents of which are hereby incorporated by reference.

BACKGROUND OF THE INVENTION

1. Field of the Invention

The present invention relates to a data processing apparatus, a controlling method and a data processing system.

2. Description of the Related Art

Recently, in accordance with the increase of devices connected to networks or the improvement in network communication speed, embodiments (services) in which files on a file server are operated by device terminals via networks have become widespread. Further, services provided in cooperation with devices have also been developed, such as printing a file on a file server by an image forming apparatus (device) such as a multifunction peripheral, a printer or the like, based on an operation from a device terminal, for example. In such services provided via the networks, a device terminal can access a file on a file server via a Virtual Private Network (VPN) or the like even when the device terminal accessing the file on the file server is not in a company network (internal network).

However, data stored on the file server include data with high confidentiality. Thus, a problem in that leakage of information may occur from a device terminal if a user of the device terminal can access the file on the file server even when the device terminal is not in the company network (internal network) via the VPN or the like.

Patent Document 1 discloses a technique in which the determination of whether data can be used is based on positional information of a user who uses the data to limit the use of the data.

However, according to the technique disclosed in Patent Document 1, although it may be possible to limit the use of a device providing a single function based on the positional information, it is impossible to limit the use of a service provided by a plurality of devices cooperating with each other. Further, in order to limit the use of such a service provided by the plurality of devices cooperating with each other, it is necessary to set a limitation for each of the devices, and that causes inconvenience for the user.

[Patent Document 1] Japanese Laid-open Patent Publication No. 2008-250930

SUMMARY OF THE INVENTION

The present invention is made in light of the above problems, and provides a technique in which the determination of whether a predetermined process is processable is based on a position of a terminal device requesting to use the predetermined process.

According to an embodiment, there is provided a data processing apparatus connected to a terminal device and providing a service in response to a request from the terminal device, including a processable condition storing unit that stores one or more services providable by the data processing apparatus and a position of a terminal device to which provision of the service is permitted in correspondence with each of the services; a receiving unit that receives a service request of requesting provision of a service and positional information of the terminal device sent from the terminal device; and a control unit that controls the data processing apparatus to provide the service requested by the service request when the position indicated by the positional information received by the receiving unit is included in the position that is in correspondence with the service requested by the service request received by the receiving unit in the processable condition storing unit.

According to another embodiment, there is provided a method of controlling performed by a data processing apparatus connected to a terminal device and providing a service in response to a request from the terminal device, the data processing apparatus including a processable condition storing unit that stores one or more services providable by the data processing apparatus and a position of a terminal device to which provision of the service is permitted in correspondence with each of the services. The method includes receiving a service request of requesting provision of a service and positional information of the terminal device sent from the terminal device; and controlling the data processing apparatus to provide the service requested by the service request when the position indicated by the positional information received by the receiving unit is included in the position that is in correspondence with the service requested by the service request received by the receiving unit in the processable condition storing unit.

Further, according to another embodiment, there is provided a data processing system including a terminal device; and the above described data processing apparatus connected to the terminal device and providing a service in response to a request from the terminal device, wherein the terminal device includes a sending unit that sends a service request of requesting the provision of the service and positional information of the terminal device, to the data processing apparatus.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 6 is a view illustrating an example of a structure of device information of the embodiment;

FIG. 7 is a view illustrating an example of information stored in a user information management DB of the embodiment;

FIG. 8 is a view illustrating an example of information stored in a service information management DB of the embodiment;

FIG. 9 is a view illustrating an example of information stored in usable condition management DB of the embodiment;

FIG. 10 is a view illustrating an example of information stored in a site information management DB of the embodiment;

FIG. 15 is a view illustrating an example of information stored in an output device information management DB of the alternative example of the embodiment;

FIG. 16 is a view illustrating an example of information stored in the usable condition management DB of the alternative example of the embodiment.

DETAILED DESCRIPTION OF THE PREFERRED EMBODIMENTS

Figure 1:
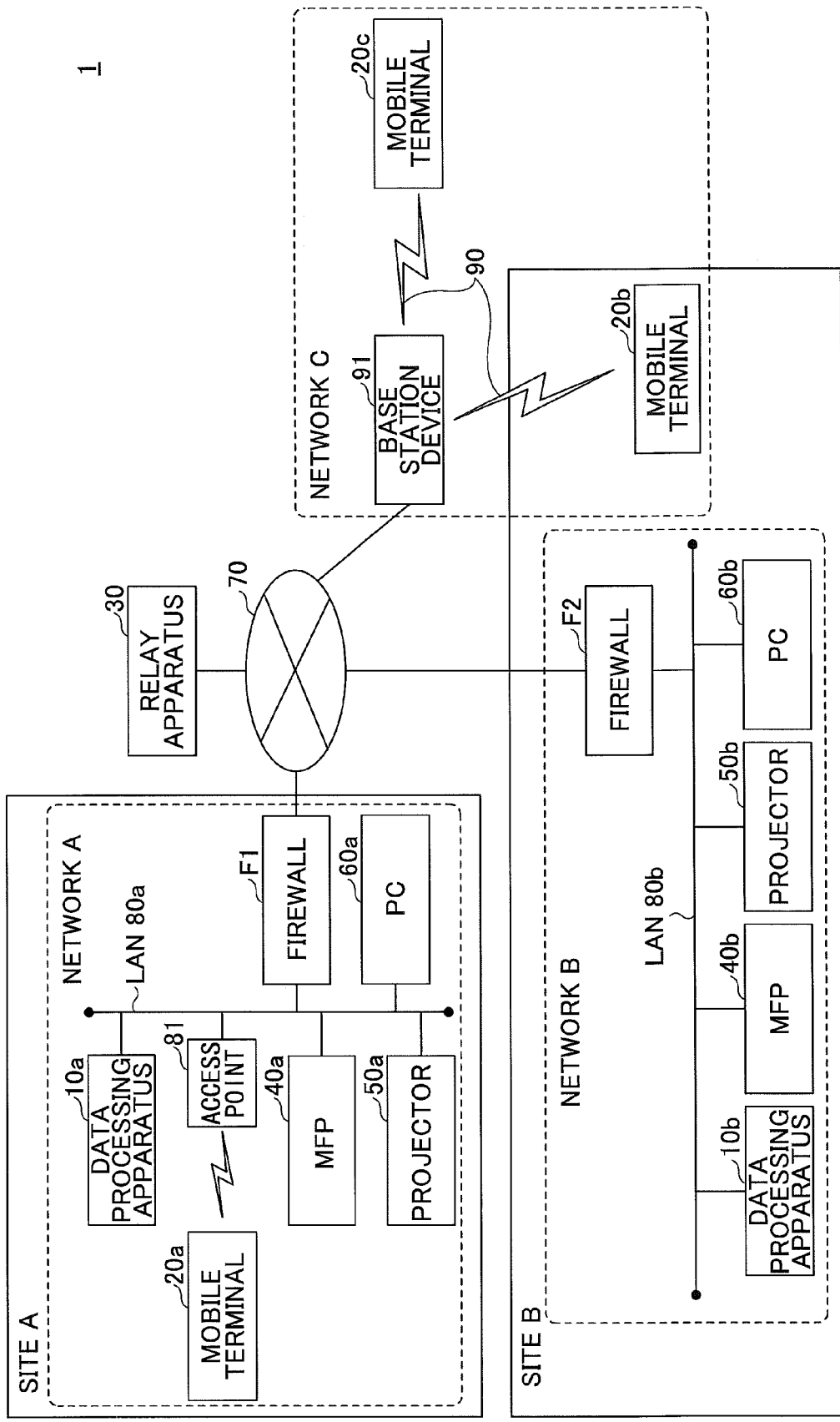
FIG. 1 is a view illustrating an example of a system structure of a cooperation processing system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(System Structure)

FIG. 1 is a view illustrating an example of a system structure of a cooperation processing system 1, as an example of a data processing system.

As illustrated in FIG. 1, the cooperation processing system 1 includes data processing apparatuses 10a and 10b (referred to as a "data processing apparatus 10" as well when they are not differentiated), mobile terminals 20a to 20c (referred to as a "mobile terminal 20" as well when they are not differentiated), a relay apparatus 30, MFPs 40a and 40b (referred to as a "MFP 40" as well when they are not differentiated), projectors 50a and 50b (referred to as a "projector 50" as well when they are not differentiated), and personal computers (PC) 60a and 60b (referred to as a "PC 60" as well when they are not differentiated). In this embodiment, the data processing apparatus 10, the mobile terminal 20, the MFP 40, the projector 50 and the PC 60 are referred to as a "device" as well when they are not differentiated.

The data processing apparatus 10a, the mobile terminal 20a, the MFP 40a, the projector 50a and the PC 60a are connected to a Local Area Network (LAN) 80a and further connected to a public network 70 via a firewall F1. The network 70 is a Wide Area Network (WAN) and includes INTERNET or a WAN for a company configured by an IP-VPN (Virtual Private Network), an INTERNET VPN and wide area Ethernet (registered trademark). The mobile terminal 20a is connected to the LAN 80a via an access point 81 of a wireless LAN that is based on IEEE 802.11 standard, for example. Alternatively, the mobile terminal 20a may be connected to the LAN 80a via a wired LAN such as Ethernet. Further, the "LAN 80a" is referred to as a "network A" in the following. The network A is a network in a site A, that is an office or the like of a company, for example.

The data processing apparatus 10b, the MFP 40b, the projector 50b and the PC 60b are connected to a LAN 80b and further connected to the network 70 via a firewall F2. The LAN 80b is also referred to as a "network B" in the following. The network B is a network in a site B, that is a company or the like, for example.

The mobile terminal 20b and the mobile terminal 20c communicate with a base station device 91, and are connected to the network 70 via a mobile communication network 90 such as 3G, Long Term Evolution (LTE) or the like configured by the base station device 91 or the like. The mobile communication network 90 is referred to as a "network C". For the example illustrated in FIG. 1, the mobile terminal 20b receives a radio wave sent from the base station device 91 and communicates with the base station device 91 in a building or a lot of the site B. On the other hand, the mobile terminal 20c receives a radio wave sent from the base station device 91 and communicates with the base station device 91 at a position outside a building or a lot of the site A, or the building or the lot of the site B.

The relay apparatus 30 is connected to the network 70.

Here, the network A, the network B and the network C are referred to as a "private network" as well when they are not differentiated. In this embodiment, devices that are connected to the different private networks communicate with each other via the relay apparatus 30 that is connected to the network 70. The firewalls F1 and F2 may be Network Address Translation (NAT) devices or the like that convert IP address.

The number of the data processing apparatuses 10, the mobile terminals 20, the MFPs 40, the projectors 50 and the PCs 60 in the cooperation processing system 1 may be arbitrarily determined.

Further, the MFP 40 or the projector 50 may not be used based on a content of a cooperation processing service.

In the cooperation processing system 1 of the embodiment, one of the data processing apparatuses 10 processes a cooperation processing service in cooperation with another data processing apparatus 10, the MFP 40, the projector 50, the PC 60 or the like, based on a request from the mobile terminal 20 or the like. The cooperation processing service is a service in which functions of the devices are made to cooperate with each other. The cooperation processing service is a service or the like used via a browser of the mobile terminal 20 or the like, for example. Specifically, the cooperation processing service is, for example, a service of storing data scanned by the MFP 40 in a shared folder of the data processing apparatus 10, a service of printing data stored in the shared folder of the data processing apparatus 10 by the MFP 40 or the like. Then, the cooperation processing system 1 of the embodiment controls the data processing apparatus 10 to determine whether the mobile terminal 20 can use the cooperation processing service based on the position of the mobile terminal 20 requesting to use the cooperation processing service, and performs an access control for the cooperation processing service.

A general Operating System (OS) is mounted on the data processing apparatus 10. The data processing apparatus 10 is a computer that functions as a file server capable of storing files, and performs processes to the stored files based on a predetermined process flow. The data processing apparatus 10 provides a shared folder usable for a user having an access right to the data processing apparatus 10 by the mobile terminal 20. Further, the data processing apparatus 10 is capable of accessing shared folders provided by the other devices via Web API, and provides the cooperation processing service in which the devices cooperate with each other. When providing the cooperation processing service, the data processing apparatus 10 controls whether the cooperation processing service is usable or unusable for the mobile terminal 20 based on positional information of the mobile terminal 20.

The mobile terminal 20 is a terminal device carried and operated by a user such as a smart device like a smartphone, a tablet terminal or the like, a mobile phone, a notebook PC or the like, for example. A cooperation processing application program that is a special-purpose application program for connecting to the data processing apparatus 10 is mounted on the mobile terminal 20 of the embodiment.

The mobile terminal 20 enables a user to view files stored in a shared folder, download and upload files from and to files stored in the data processing apparatus 10, project data using the projector 50, print or scan data using the MFP 40, by the cooperation processing application program of the mobile terminal 20 via a Web API provided by the data processing apparatus 10. Further, the mobile terminal 20 enables the user to operate the files stored in the data processing apparatus 10 via the mobile communication network 90 or the wireless LAN. Further, the mobile terminal 20 has a Global Positioning System (GPS) communication function for obtaining positional information of the mobile terminal 20. When the mobile terminal 20 communicates with the data processing apparatus 10, the mobile terminal 20 sends positional information obtained by the GPS communication function.

The relay apparatus 30 is a computer that relays data communicated between devices that are connected to the different networks (private networks). The relay apparatus 30 enables an access from an external device connected to another private network to the data processing apparatus 10 so that the external device can use the cooperation processing service provided by the data processing apparatus 10.

The MFP 40 is an example of an output apparatus that outputs (prints) electronic data such as MFP or the like on which a copying function, a facsimile (FAX) function, a print function, a scanner function, a delivering function of delivering an input image and the like are mounted. The MFP 40 accesses the data processing apparatus 10 by a browser mounted on the MFP 40 to store data scanned by the MFP 40 in the data processing apparatus 10, print data stored in the data processing apparatus 10 or the like. When the cooperation processing service is to process a print process, a printer may be used instead of the MFP 40, for example.

The projector 50 is an example of the output apparatus that projects electronic data. The projector 50 projects a file stored in the data processing apparatus 10 based on an instruction by the mobile terminal 20.

The PC 60 stores a file or data in the shared folder of the data processing apparatus 10, or operates or browses the file or data stored in the shared folder of the data processing apparatus 10.

(Hardware Structure)
(Data Processing Apparatus)

Figure 2:
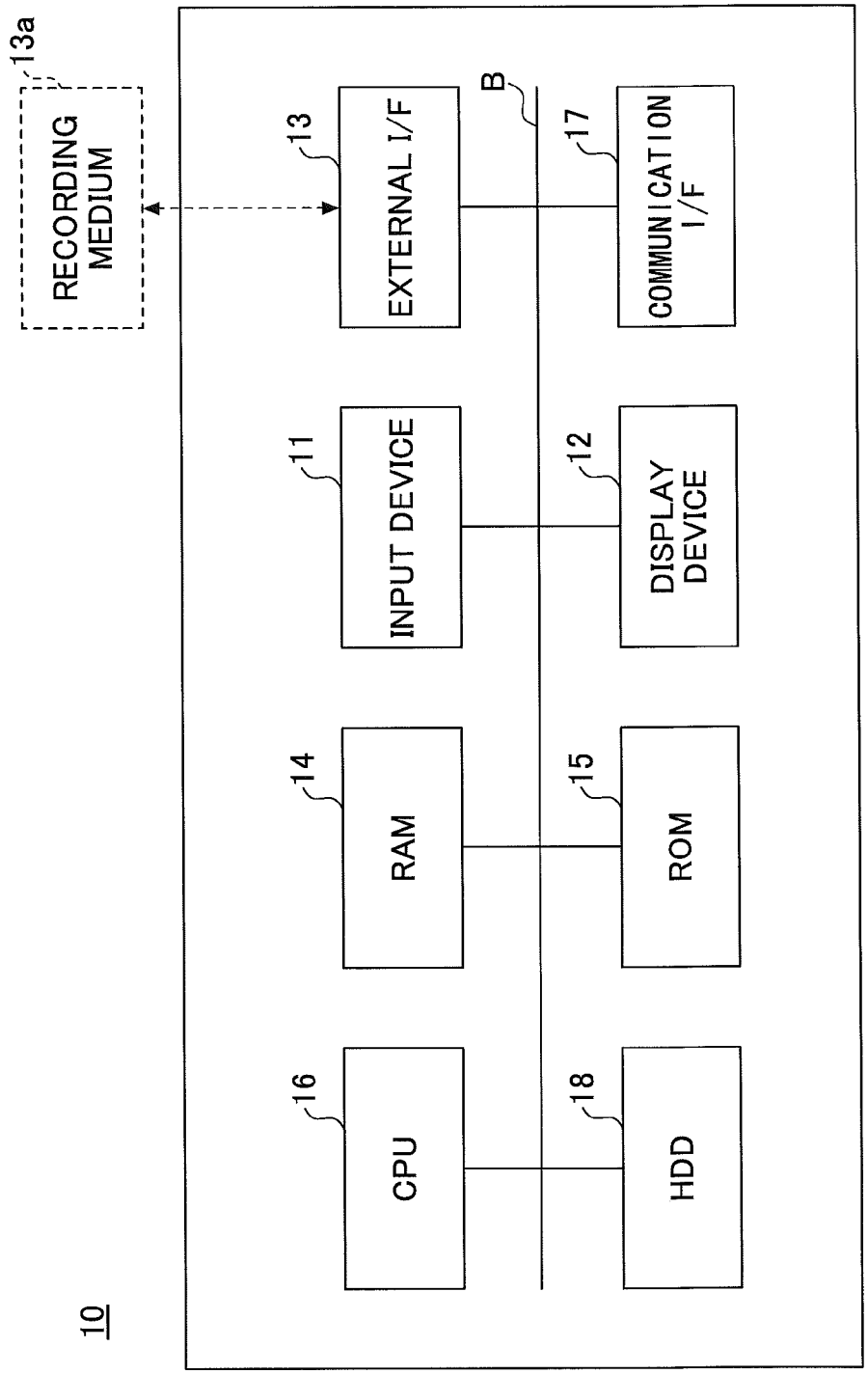
FIG. 2 is a view illustrating an example of a hardware structure of a data processing apparatus of the embodiment.

FIG. 2 is a view illustrating an example of a hardware structure of the data processing apparatus 10 of the embodiment.

The data processing apparatus 10 includes an input device 11, a display device 12, an external I/F 13, a RAM 14, a ROM 15, a CPU 16, a communication I/F 17, a HDD 18 and the like that are connected with each other via a bus B.

The input device 11 includes a keyboard, a mouse or the like, and is used for inputting various operation signals to the data processing apparatus 10.

The display device 12 includes a display or the like and displays a processed result by the data processing apparatus 10. The communication I/F 17 is an interface that connects the data processing apparatus 10 to the network. The data processing apparatus 10 is capable of having data communication with other apparatuses or devices via the communication I/F 17.

The HDD 18 is a nonvolatile storage device that stores programs or data. The programs or data stored in the HDD 18 include an Operating System (OS) that is basic software and controls the entirety of the data processing apparatus 10, application programs that provide various functions on the OS or the like. The HDD 18 manages the programs or data stored therein by a predetermined file system and/or a database (DB).

The external I/F 13 is an interface with an external device. The external device includes a recording medium 13a or the like. The data processing apparatus 10 is capable of reading and writing data from and onto the recording medium 13a via the external I/F 13. The recording medium 13a includes a flexible disk, a CD, a Digital Versatile Disk (DVD), an SD memory card, a Universal Serial Bus (USB) memory or the like.

The ROM 15 is a nonvolatile semiconductor memory (storage device) capable of storing programs or data even when the power is not supplied. The ROM 15 stores programs or data such as a Basic Input/Output System (BIOS) that is executed when initiating the data processing apparatus 10, OS settings, network settings or the like. The RAM 14 is a volatile semiconductor memory (storage device) that temporarily stores programs or data.

The CPU 16 is an arithmetic device that controls and actualizes functions of the entirety of the data processing apparatus 10 by reading out the programs or data from storage devices such as the ROM 15, the HDD 18 or the like on the RAM 14 and executing processes.

The data processing apparatus 10 of the embodiment may actualize various processes, which will be explained later, by the above explained hardware structure.

The relay apparatus 30 and the PC 60 also has the same hardware structure as illustrated in FIG. 2.

(Mobile Terminal)

Figure 3:
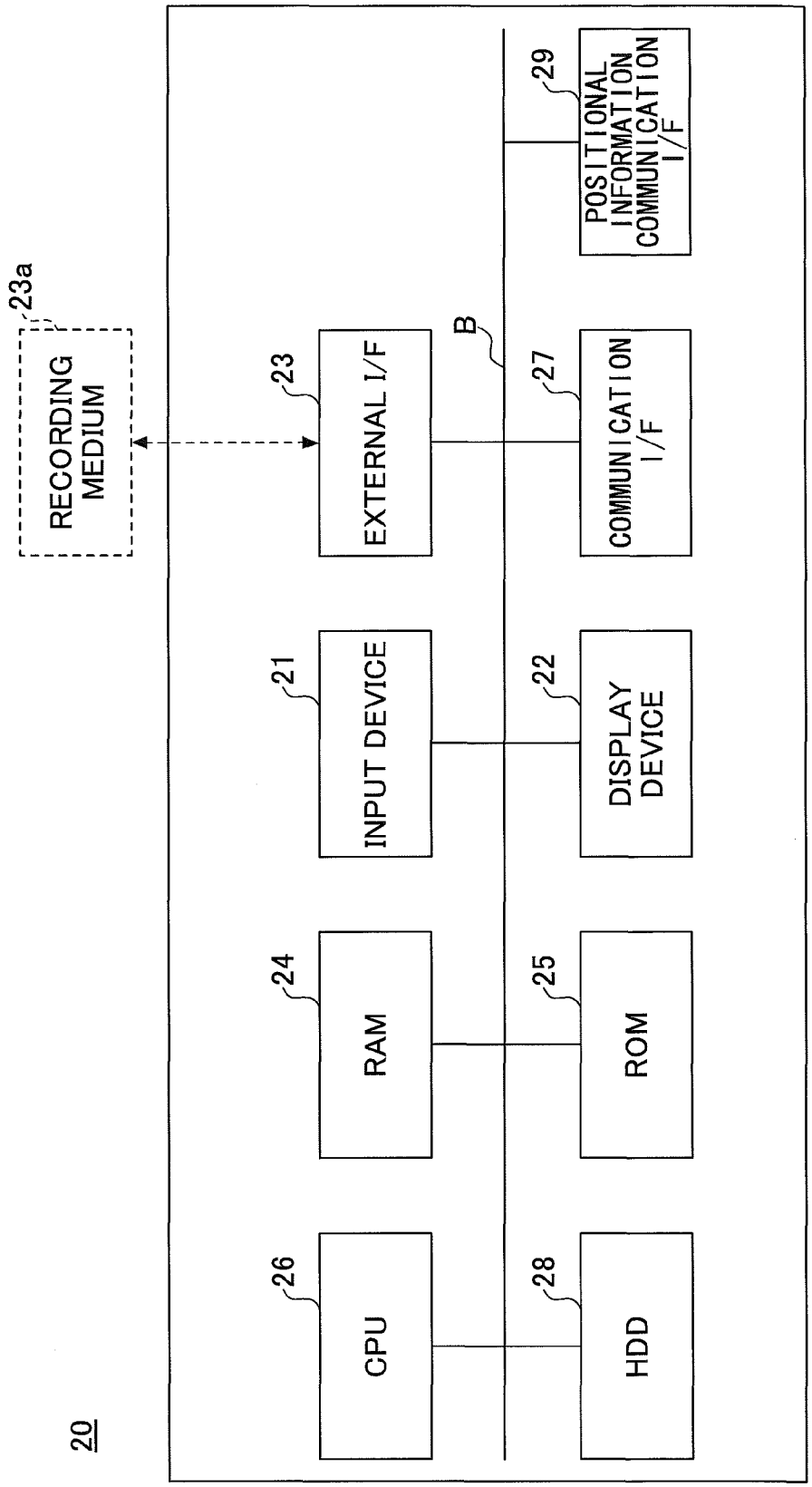
FIG. 3 is a view illustrating an example of a hardware structure of a mobile terminal of the embodiment.

FIG. 3 is a view illustrating an example of a hardware structure of the mobile terminal 20 of the embodiment.

The mobile terminal 20 includes an input device 21, a display device 22, an external I/F 23, a RAM 24, a ROM 25, a CPU 26, a communication I/F 27, a HDD 28, a positional information communication I/F 29 and the like that are connected with each via a bus B.

The input device 21 includes a touch panel, a keyboard, a mouse and the like, and is used for inputting various operation signals to the mobile terminal 20.

The display device 22 includes a display or the like and displays a processed result by the mobile terminal 20. The communication I/F 27 is an interface that connects the mobile terminal 20 to the network. The mobile terminal 20 is capable of having data communication with other apparatuses or devices via the communication I/F 27.

The HDD 28 is a nonvolatile storage device that stores programs or data. The programs or data stored in the HDD 28 include an Operating System (OS) that is basic software and controls the entirety of the mobile terminal 20, application programs or the like that provide various functions on the OS. The HDD 28 manages the programs or data stored therein by a predetermined file system and/or a database (DB).

The external I/F 23 is an interface with an external device. The external device includes a recording medium 23a or the like. The mobile terminal 20 is capable of reading and writing data from and onto the recording medium 23a via the external I/F 23. The recording medium 23a includes a flexible disk, a CD, a Digital Versatile Disk (DVD), an SD memory card, a Universal Serial Bus (USB) memory or the like.

The ROM 25 is a nonvolatile semiconductor memory (storage device) capable of storing programs or data even when the power is not supplied. The ROM 25 stores programs or data such as a Basic Input/Output System (BIOS) that is executed when initiating the data processing apparatus 10, OS settings, network settings or the like. The RAM 24 is a volatile semiconductor memory (storage device) that temporarily stores programs or data.

The CPU 26 is an arithmetic device that controls and actualizes functions of the entirety of the mobile terminal 20 by reading out the programs or data from storage devices such as the ROM 25, the HDD 28 or the like on the RAM 24 and executing processes.

The positional information communication I/F 29 is a communication interface for receiving a positional information signal such as a GPS signal or the like, for example.

The mobile terminal 20 of the embodiment may actualize various processes, which will be explained later, by the above explained hardware structure.

(MFP)

Figure 4:
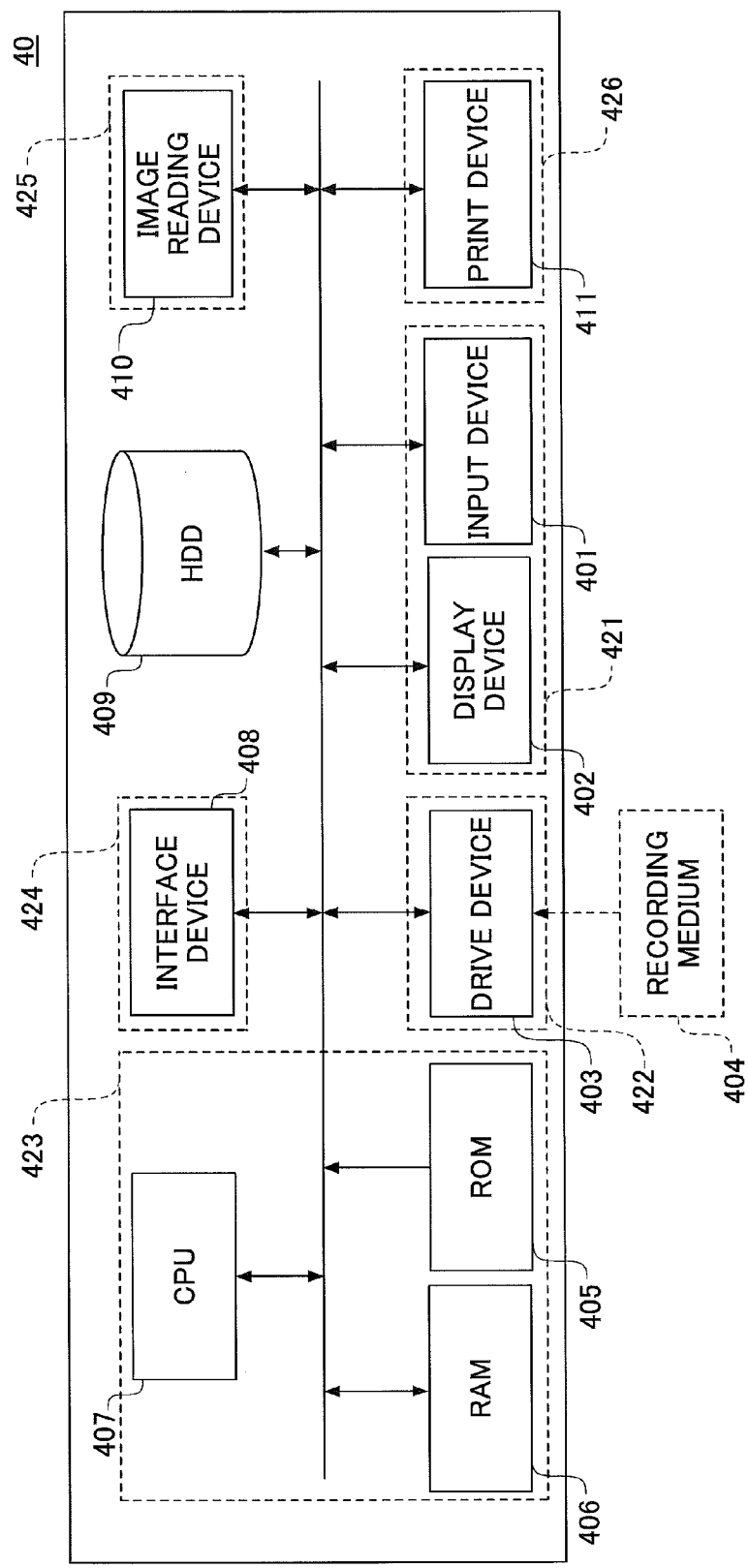
FIG. 4 is a view illustrating an example of a hardware structure of a MFP of the embodiment.

FIG. 4 is a view illustrating an example of a hardware structure of the MFP 40 of the embodiment.

The MFP 40 of the embodiment includes an operation panel 421, a recording medium I/F 422, a controller 423, a data communication I/F 424, a HDD (Hard Disk Drive) 409, a scanner 425 and a plotter 426 that are connected via a bus with each other.

The operation panel 421 includes an input device 401 and a display device 402. The input device 401 is configured by a hardware key or the like, and is used for inputting various operation signals to the MFP 40. The display device 402 is configured by a display or the like, and displays various information regarding an image forming operation, for example.

The data communication I/F 424 including an interface device 408 is an interface that connects the MFP 40 to a transmission path such as a network or the like. The HDD 409 stores various data such as received document data, read image data or the like processed by the MFP 40. The HDD 409 manages the various data stored therein by a predetermined file system and/or a database (DB).

The various data stored in the HDD 409 include electronic data that are recorded by an external device such as a smartphone, a digital camera or the like. In such a case, the various data are provided to the MFP 40 via a recording medium 404 such as an SD card or the like or uploaded to the MFP 40 via a network or the like that is a transmission path. The recording medium 404 is set in a drive device 403 of the recording medium I/F 422 and the various data are written on the HDD 409 from the recording medium 404 via the drive device 403.

The controller 423 includes a ROM 404, a RAM 406 and a CPU 407. The ROM 404 stores programs or various data that are executed when the MFP 40 is initiated. The RAM 406 temporarily stores various programs or data read out from the ROM 404 or the HDD 409. Further, the CPU 407 executes the program that is temporarily stored in the RAM 406. Upon receiving print data via the data communication I/F 424, for example, the controller 423 executes a program (PDL parser), read out from the ROM 404 on the RAM 406 and is capable of interpreting PDL (Page Description Language), by the CPU 407 to interpret the print data and generate a bitmap image.

The scanner 425 including an image reading device 410 generates image data by optically reading a document placed on a reading surface. The plotter 426 including a print device 411 prints a bitmap image on a recording paper by an electrophotographic process, for example.

As such, the MFP 40 of the embodiment actualizes a plurality of functions such as a copier, a printer, a facsimile, a scanner or the like by the above explained hardware structure.

(Functional Structure)

Figure 5:
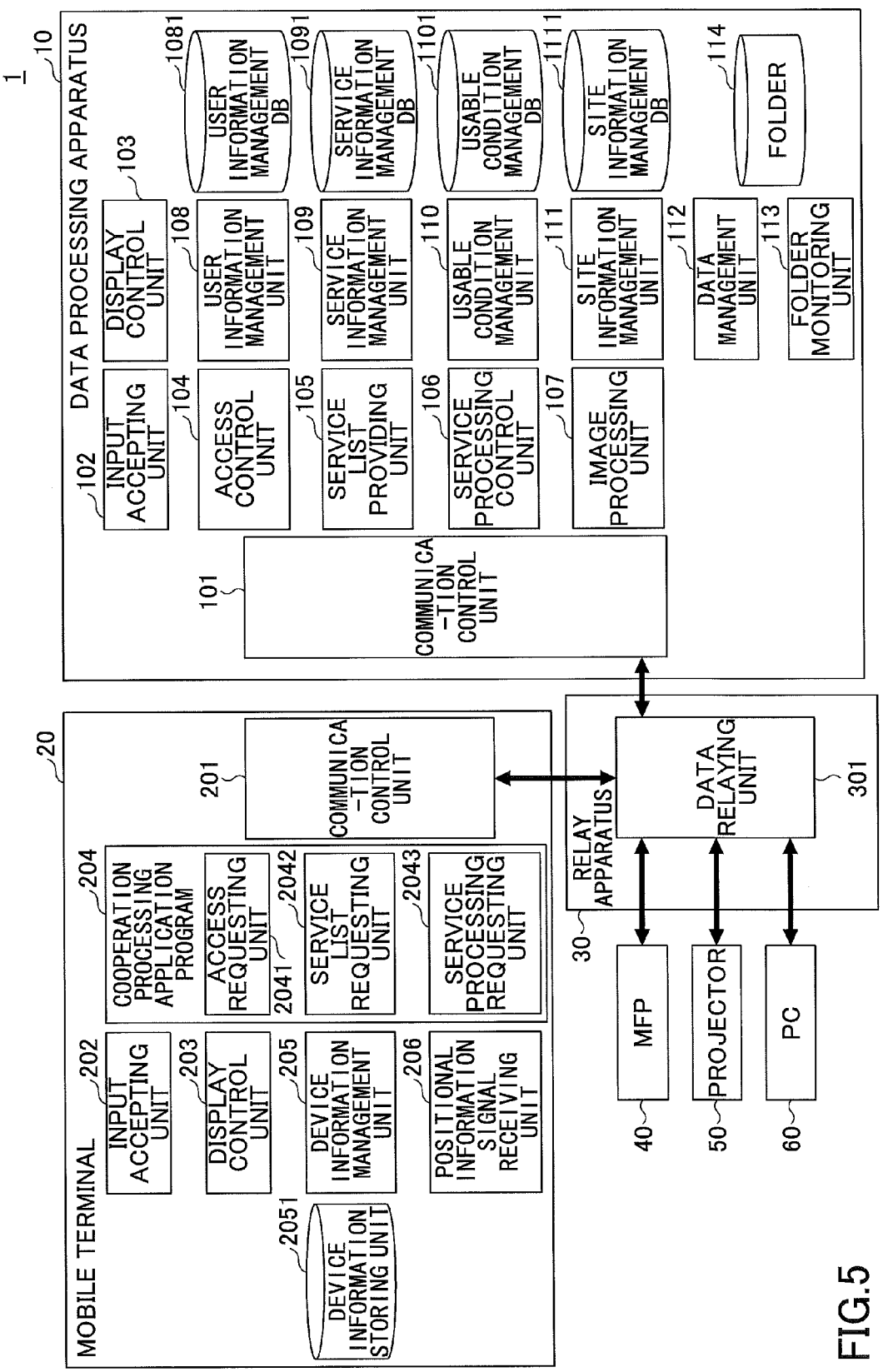
FIG. 5 is a view illustrating an example of a functional structure of the cooperation processing system of the embodiment.

FIG. 5 is a view illustrating an example of a functional structure of the cooperation processing system 1 of the embodiment.

(Mobile Terminal)

The mobile terminal 20 includes a communication control unit 201, an input accepting unit 202, a display control unit 203, a cooperation processing application program 204, a device information management unit 205, a positional information signal receiving unit 206, a device information storing unit 2051 and the like. The cooperation processing application program 204 includes an access requesting unit 2041, a service list requesting unit 2042 and a service processing requesting unit 2043.

Each function is actualized by the CPU 26 by executing the programs in cooperation with the hardware.

The communication control unit 201 controls the communication I/F 27 and sends and receives data to and from the data processing apparatus 10 using a protocol such as Hyper Text Transfer Protocol (HTTP), HTTP over Secure Socket Layer (HTTPS), Server Message Block (SMB) or the like. The protocol used for the communication is not limited to those described above, and File Transfer Protocol (FTP) may be used, for example. When the mobile terminal 20 and the data processing apparatus 10 belong to different private networks, the mobile terminal 20 and the data processing apparatus 10 communicate with each other via the relay apparatus 30. On the other hand, when the mobile terminal 20 and the data processing apparatus 10 belong to the same private network, the mobile terminal 20 and the data processing apparatus 10 directly communicate with each other via the LAN.

The input accepting unit 202 controls the input device 21 to receive an input instruction from the user.

The display control unit 203 controls the display device 22 to output data to be displayed for the user.

The cooperation processing application program 204 is an application program that has a function to use the cooperation processing service and is previously installed in the mobile terminal 20.

The access requesting unit 2041 of the cooperation processing application program 204 inquires the data processing apparatus 10 whether the user of the mobile terminal 20 has an access right to the data processing apparatus 10. Specifically, the access requesting unit 2041 generates an access request including a device ID that uniquely identifies the mobile terminal 20 and sends the access request to the data processing apparatus 10. When it is determined that the user of the mobile terminal 20 has the access right, the data processing apparatus 10 issues an access ticket indicating that the access from the mobile terminal 20 to the data processing apparatus 10 is permitted, as will be explained later. The access requesting unit 2041 receives the access ticket.

When it is determined that the user of the mobile terminal 20 has the access right, the service list requesting unit 2042 requests a service list indicating one or more cooperation processing services processable by the data processing apparatus 10, to the data processing apparatus 10.

The service processing requesting unit 2043 sends a service processing request of processing the service selected by the user from the service list obtained by the service list requesting unit 2042 to the data processing apparatus 10. The service processing request includes a device ID and positional information (latitude, longitude) of the mobile terminal 20.

The device information management unit 205 manages the device ID, stored in the device information storing unit 2051, that uniquely identifies the mobile terminal 20 (device) and reads out the respective device ID in response to a request from another function. The device ID is included in device information stored in the respective device. The device information stored by the respective device has a structure as illustrated in FIG. 6.

FIG. 6 is a view illustrating an example of a structure of the device information of the embodiment. As illustrated in FIG. 6, the device information includes "DeviceId", "friendlyName", "manufacturerName, "modelName" and the like. The "DeviceId" (device ID) is an ID that is unique to each device. The "friendlyName" is a model name of the device. The "manufacturerName" is a name of a manufacturer of the device. The information for identifying the device is not limited to the "device ID" and may be a MAC address of the device, for example.

Referring back to FIG. 5, the positional information signal receiving unit 206 controls the positional information communication I/F 29 and receives a positional information signal such as a GPS signal or the like. The positional information signal receiving unit 206 receives the positional information signal when the mobile terminal 20 requests processing of the cooperation processing service to the data processing apparatus 10 after selecting the cooperation processing service to use. Alternatively, the positional information may be received every predetermined period (10 second period, for example), or when the cooperation processing application program 204 is initiated or the like. Then, the positional information signal receiving unit 206 outputs the received positional information signal to the service processing requesting unit 2043.

(Data Processing Apparatus)

The data processing apparatus 10 includes a communication control unit 101, an input accepting unit 102, a display control unit 103, an access control unit 104, a service list providing unit 105, a service processing control unit 106, an image processing unit 107, a user information management unit 108, a service information management unit 109, a usable condition management unit 110, a site information management unit 111, a data management unit 112, a folder monitoring unit 113, a folder 114, a user information management DB 1081, a service information management DB 1091, a usable condition management DB 1101, a site information management DB 1111 and the like. Each function is actualized by the CPU 16 by executing the programs in cooperation with the hardware.

The communication control unit 101 controls the communication I/F 17 and sends and receives data to and from each device using a protocol such as HTTP, HTTPS, SMB or the like. The protocol used for the communication is not limited to those described above, and FTP may be used, for example.

The input accepting unit 102 controls the input device 11 and accepts an input instruction from the user.

The display control unit 103 controls the display device 12 and outputs information for the user to be displayed.

Upon receiving the access request from the mobile terminal 20, the access control unit 104 determines whether the user of the mobile terminal 20 has an access right to be connected to the data processing apparatus 10. As described above, the access request includes a device ID that uniquely specifies the mobile terminal 20. Specifically, the access control unit 104 determines whether the device ID included in the access request is included in the user information management DB 1081 via the user information management unit 108. Then, when the device ID included in the access request is included in the user information management DB 1081, the access control unit 104 issues the access ticket indicating that the access from the mobile terminal 20 to the data processing apparatus 10 is permitted.

Upon receiving the service list obtain request sent from the mobile terminal 20, the service list providing unit 105 obtains a service list from the service information management DB 1091 via the service information management unit 109. Then, the service list providing unit 105 sends the service list to the mobile terminal 20 requesting the service list.

Upon receiving the service processing request sent from the mobile terminal 20, the service processing control unit 106 determines whether the cooperation processing service designated by the mobile terminal 20 is usable or unusable based on the position of the mobile terminal 20. The processing steps for determining whether the cooperation processing service is usable or unusable are explained later with reference to FIG. 13 in detail. Then, when it is determined that the cooperation processing service cannot be used, the service processing control unit 106 sends the determined result to the mobile terminal 20. On the other hand, when it is determined that the cooperation processing service can be used, the service processing control unit 106 processes the process of the cooperation processing service.

The image processing unit 107 performs a data conversion of converting a file format of data to a file format corresponding to each device, or performs an Optical Character Reader (OCR) process on an input image input from a device to form a PDF file with text information.

The user information management unit 108 manages information regarding users (user information) using the user information management DB 1081, and reads and writes the user information.

FIG. 7 is a view illustrating an example of the information stored in the user information management DB 1081 of the embodiment. As illustrated in FIG. 7, the user information management DB 1081 includes data items such as "user ID", "user name", "device ID", "term of validity of access ticket" and the like. The "user ID" is identification information that uniquely identifies the user in the user information management DB 1081. The "user name" is a name of a user who uses the mobile terminal 20 (device). The "device ID" is identification information, unique to each device, of the device used by the user. The "term of validity of access ticket" is information indicating a term of validity of the access right issued for the user who is determined to have the access right of the data processing apparatus 10 by the access control unit 104. When "N/A" (not Available) is set for the item "term of validity of access ticket", it means that the access ticket is not issued for the user.

Referring back to FIG. 5, the service information management unit 109 manages information regarding the cooperation processing service using the service information management DB 1091.

FIG. 8 is a view illustrating an example of information stored in the service information management DB 1091 of the embodiment. As illustrated in FIG. 8, the service information management DB 1091 includes data items such as "service ID", "cooperation processing service name", "applied usable condition ID" and the like.

The "service ID" is identification information for uniquely identifying the cooperation processing service (co-operation processing service name). The "cooperation processing service name" is a name of the cooperation processing service. The "applied usable condition ID" is usable condition ID that identifies a usable condition applied to the respective cooperation processing service. The content of the usable condition corresponding to the usable condition ID is stored in the usable condition management DB 1101.

The service contents of the "cooperation processing service name" illustrated in FIG. 8 are as follows.

"SCAN TO FOLDER" is a service to store data scanned by the usable MFP 40 in the shared folder of the processing apparatus 10 via the browsers of the mobile terminal 20 and the MFP 40.

"SCAN TO MAIL" is a service to send data scanned by the usable MFP 40 to the data processing apparatus 10, attach the data to an e-mail and send the e-mail via the browsers of the mobile terminal 20 and the MFP 40.

"FOLDER TO FAX" is a service to link a process to a shared folder of the usable data processing apparatus 10 and fax a file stored in the folder via the MFP 40 from the mobile terminal 20 and the PC 60.

"FOLDER TO COLOR PRINT" is a service to color print data stored in the shared folder of the usable data processing apparatus 10 by the MFP 40 via the browsers of the mobile terminal 20 and the MFP 40. "FOLDER TO MONOCHROME PRINT" is a service to monochrome print data stored in the usable data processing apparatus 10 by the MFP 40 via the browsers of the mobile terminal 20 and the MFP 40.

"FOLDER TO PROJECTOR PROJECTION" is a service to project data stored in the usable data processing apparatus 10 via the projector 50 from the mobile terminal 20.

"FILE BROWSING" is a service to browse a file stored in the usable data processing apparatus 10 via the browsers of the mobile terminal 20, the MFP 40 and the PC 60. "FILE OPERATION" is a service to edit, delete, rename or move a file stored in the usable data processing apparatus 10 from the mobile terminal 20 and the PC 60.

"DATA DOWNLOAD" is a service to download data stored in the usable data processing apparatus 10 from the mobile terminal 20 and the PC 60. "DATA UPLOAD" is a service to upload data to the usable data processing apparatus 10 from the mobile terminal 20 and the PC 60.

Referring back to FIG. 5, the usable condition management unit 110 stores a usable condition (processable condition) in which a place where the request of processing the cooperation processing service is sent and whether the cooperation processing service is usable or unusable are in correspondence with each other, using the usable condition management DB 1101.

FIG. 9 is a view illustrating an example of information stored in the usable condition management DB 1101 of the embodiment. As illustrated in FIG. 9, the usable condition management DB 1101 includes data items such as "usable condition ID", "usable condition" and the like.

The "usable condition ID" is identification information for identifying the usable condition. The "usable condition" indicates a condition (rule) for determining whether the device (mobile terminal 20) requesting the processing of the cooperation processing service can use the cooperation processing service.

The usable conditions illustrated in FIG. 9 are explained. The usable condition "usable from any site" indicates that the cooperation processing service can be used regardless of the positional information of the device requesting to use the cooperation processing service.

The usable condition "only usable from own company site" indicates that the cooperation processing service can be used when the positional information of the device is within own company's site. The usable condition "only usable from other company site" indicates that the cooperation processing service can be used when the positional information of the device is within another company's site. The usable condition "only usable from designated site" indicates that the cooperation processing service can be used when the positional information of the device is within a site that is previously designated.

The usable condition "only usable from same site" indicates that the cooperation processing service can be used when the positional information of the device is within the site same as the data processing apparatus 10 is provided, in other words, when the device and the data processing apparatus 10 are connected to the same LAN.

The usable condition "only usable from different site" indicates that the cooperation processing service can be used when the positional information of the device is different from the site of the data processing apparatus 10, in other words, when the communication between the device and the data processing apparatus 10 is relayed by the relay apparatus 30. The usable condition "unusable from any site" indicates that the cooperation processing service cannot be used regardless of the positional information of the device processing service. The usable conditions illustrated in FIG. 9 are just examples and usable conditions may be arbitrarily set.

Referring back to FIG. 5, the site information management unit 111 manages information regarding a site using the site information management DB 1111.

FIG. 10 is a view illustrating an example of information stored in the site information management DB 1111 of the embodiment. As illustrated in FIG. 10, the site information management DB 1111 includes data items such as "site ID", "site name", "own/other co. flag", "designated site flag", "east end", "west end", "south end", "north end" and the like. The "east end", the "west end", the "south end" and the "north end" are positional information of the site.

The "site ID" is identification information that uniquely identifies the site (site name). The "site name" is a name of the site. The "own/other co. flag" is a flag indicating whether the site is the own company site (office or the like) or other company site. The "designated site flag" is a flag for designating a specific site. For example, when usable condition is "only usable from designated site" (see FIG. 9), the site to which the flag is on is the "designated site".

The "east end", the "west end", the "south end" and the "north end" are positional information of the site and define a position of the site. The "east end" and the "west end" express boundary lines of the site at the east side and the west side by longitude (east longitude, for example). The "south end" and the "north end" are boundary lines of the site at the south side and the north side by latitude (north latitude, for example). Thus, the range of the site may be defined by a rectangle. For the example illustrated in FIG. 10, the site name "office A" corresponding to the site ID "1" is an area surrounded by four lines of north latitude "35.500000", north latitude "35.503000", east longitude "139.600000" and east longitude "139.603000". The site is not limited to rectangle and may be defined by any polygon.

The data management unit 112 manages files stored in the folder 114, and performs various file operations such as newly making a file, updating a file, deleting a file or the like.

The folder monitoring unit 113 monitors the various file operations of the file stored in the folder 114 such as newly making a file, updating a file, deleting a file or the like.

The folder 114 stores files. The files stored in the folder 114 are image files, application program files, document files and the like. The file stored in the folder 114 is an embodiment of data.

(Relay Apparatus)

The relay apparatus 30 includes a data relaying unit 301 and the like. Each function is actualized by a CPU of the relay apparatus 30 by executing programs stored in the relay apparatus 30 in cooperation with hardware of the relay apparatus 30.

The data relaying unit 301 relays communication between the device and the data processing apparatus 10 that belong to different private networks.

(Operation Steps)

Operation steps of the cooperation processing system 1 of the embodiment are explained.

Figure 11:
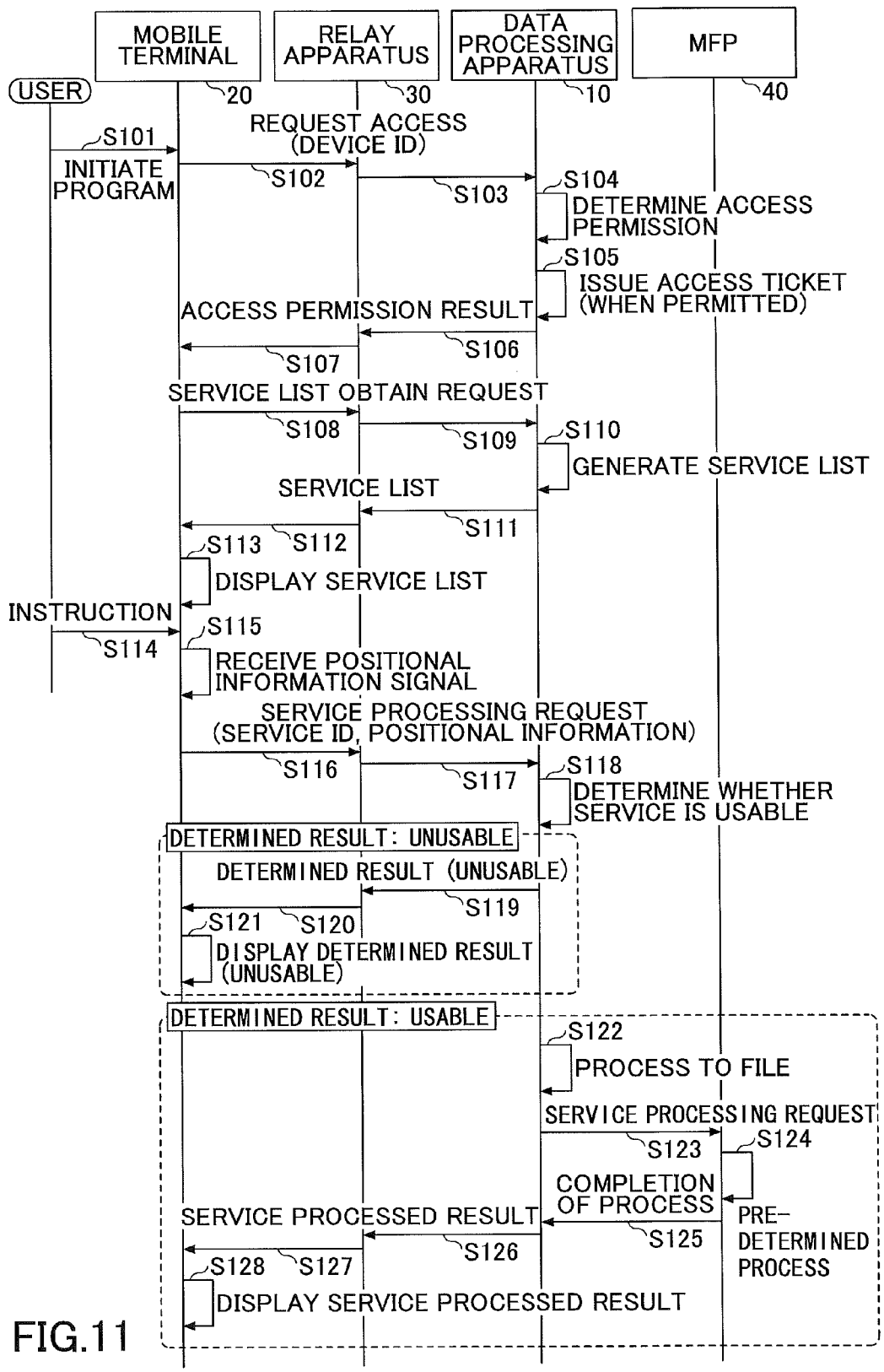
FIG. 11 is a sequence diagram illustrating an example of operating steps of the cooperation processing system of the embodiment.

FIG. 11 is a sequence diagram illustrating an example of operation steps of the cooperation processing system 1 of the embodiment. In the example illustrated in FIG. 11, the mobile terminal 20 and the data processing apparatus 10 belong to different private networks, and communicate with each other via the relay apparatus 30.

First, in order to use a cooperation processing service, the user of the mobile terminal 20 initiates the cooperation processing application program 204 that is previously installed in the mobile terminal 20 (S101). The access requesting unit 2041 of the cooperation processing application program 204 obtains a device ID of the mobile terminal 20 stored in the device information storing unit 2051, generates an access request including the device ID with an address of the data processing apparatus 10 as a destination address, and sends it to the relay apparatus 30 via the communication control unit 201 (S102). The data relaying unit 301 of the relay apparatus 30 transfers the access request to the data processing apparatus 10 (S103).

Upon receiving the access request, the access control unit 104 of the data processing apparatus 10 determines whether the user of the mobile terminal 20 has an access right to connect to the data processing apparatus 10 (S104). Specifically, the access control unit 104 determines whether the device ID included in the access request is included in the user information management DB 1081 via the user information management unit 108.

Then, when the device ID included in the access request is included in the user information management DB 1081, the access control unit 104 permits the access by the user of the mobile terminal 20. On the other hand, when the device ID included in the access request is not included in the user information management DB 1081, the access control unit 104 does not permit the access by the user of the mobile terminal 20.

Next, when it is determined that the access is permitted, the access control unit 104 issues an access ticket with a predetermined term of validity verifying that the connection to the data processing apparatus 10 is permitted (S105). On the other hand, when it is determined that the access is not permitted, the access ticket is not issued. Then, the access control unit 104 sends the access permission result obtained in step S104 with an address of the mobile terminal 20 as a destination address to the relay apparatus 30 via the communication control unit 101 (S106). Here, when the access is permitted, the access ticket is also sent to the mobile terminal 20 in addition to the access permission result. The data relaying unit 301 of the relay apparatus 30 transfers the access permission result to the mobile terminal 20 (S107).

Steps after next step S108 are processes performed when the access to the data processing apparatus 10 is permitted.

Upon receiving the access permission result indicating that the access is permitted, the service list requesting unit 2042 of the mobile terminal 20 sends a service list obtain request for obtaining a service list of the cooperation processing services providable by the data processing apparatus 10 to the relay apparatus 30 via the communication control unit 201 (S108). The data relaying unit 301 of the relay apparatus 30 transfers the service list obtain request to the data processing apparatus 10 (S109).

Upon receiving the service list obtain request, the service list providing unit 105 of the data processing apparatus 10 obtains cooperation processing service names stored in the service information management DB 1091 via the service information management unit 109. Next, the service list providing unit 105 generates a service list based on the obtained cooperation processing service names (S110). Then, the service list providing unit 105 sends the generated service list with the address of the relay apparatus 30 as a destination address to the mobile terminal 20 via the communication control unit 101 (S111). The data relaying unit 301 of the relay apparatus 30 transfers the service list to the mobile terminal 20 (S112).

Upon receiving the service list, the service list requesting unit 2042 of the mobile terminal 20 controls the display control unit 203 to perform a display operation of the service list. The display control unit 203 displays a service list screen of the cooperation processing application program 204 as illustrated in FIG. 12 (S113).

Figure 12:
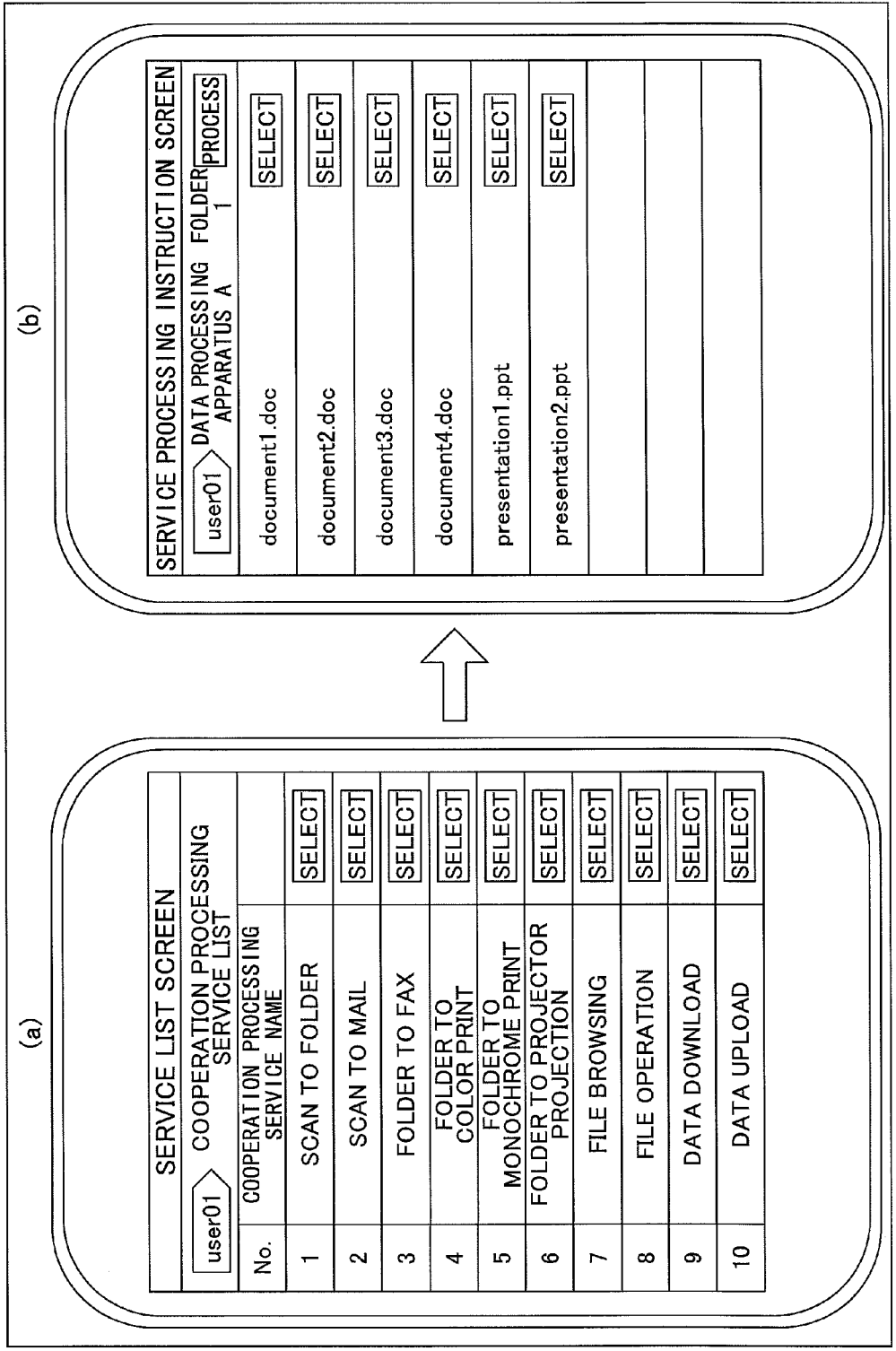
FIG. 12 is a view illustrating an example of a service list screen and a service processing instruction screen of a cooperation processing application program of the embodiment.

FIG. 12 is a view illustrating an example of a service list screen and a service processing instruction screen provided by the cooperation processing application program 204 of the embodiment. When a user pushes a "SELECT" button corresponding to a cooperation processing service that the user wishes to use in the service list screen (illustrated as (a)), the service processing instruction screen (illustrates as (b)) is displayed. Then, when the user pushes a "SELECT" button corresponding to a file to be processed by the cooperation processing service in the service processing instruction screen, and pushes a "PROCESS" button, the request of processing the cooperation processing service is sent to the data processing apparatus 10.

Referring back to FIG. 11, after selecting the cooperation processing service to use in the service list screen (illustrated as (a) in FIG. 12) and selecting the file in the service processing instruction screen (illustrated as (b) in FIG. 12), the user inputs an processing instruction of the cooperation processing service (S114).

The processing instruction may include information for specifying the MFP 40 (information for specifying the device such as an IP address, a device name, a device type number or the like of the MFP 40, for example) with which the data processing apparatus 10 cooperate to process the cooperation processing service. With this configuration to include the information for specifying the MFP 40 in the processing instruction, the cooperation processing service can be processed by the MFP 40 desired by the user. Alternatively, the processing instruction and the information regarding the MFP 40 may be separately sent. Further, although the MFP 40 is exemplified above, it is not limited so. Similarly as the MFP 40, for the electronic device (the MFP 40, the projector 50 or the like) connected to the network, by sending the information for specifying the electronic device, the cooperation processing service can be processed by the electronic device desired by the user.

The data processing apparatus 10 may manage the information specifying the electronic devices, for example, and may send the information to the user of the mobile terminal 20 with the service list. Alternatively, after selecting the service that is to be processed using the MFP 40 such as "SCAN TO FOLDER", "FOLDER TO COLOR PRINT" or the like from the service list screen (FIG. 12), information regarding the MFPs 40 connected to the network may be sent to the mobile terminal 20 as a list. This can be same for the projectors 50, the PCs 60 and the like.

For example, when the service in which the MFP 40 is used such as the "SCAN TO FOLDER", the "FOLDER TO COLOR PRINT" or the like is selected in the service list screen (FIG. 12), the information specifying the electronic device may be obtained from the electronic device (MFP 40) used for the service after the selection. The information specifying the electronic device may be obtained by the infrared communication or the Bluetooth (registered trademark) communication between the terminal device and the electronic device. Further, the information specifying the electronic device may be obtained by reading a two-dimensional code including the information specifying the electronic device displayed on a screen of the electronic device, attached to the electronic device or the like by the terminal device and analyzing it. With this configuration in which the terminal 20 obtains the information specifying the electronic device from the electronic device, for example, the user can obtain the information specifying the electronic device directly from the electronic device when the user wishes to instruct to use the service using the electronic device that is very close to the user. Thus, it is unnecessary for the user to select the electronic device from the list.

Upon receiving the processing instruction of the cooperation processing service by the user, the input accepting unit 202 controls the positional information signal receiving unit 206 to receive the positional information signal. The positional information signal receiving unit 206 receives the positional information signal (GPS signal) (S115). Then, the positional information signal receiving unit 206 outputs the positional information (latitude, longitude) based on the received positional information signal to the service processing requesting unit 2043. The service processing requesting unit 2043 generates a service processing request including a service ID of the cooperation processing service designated in step S114 and the positional information (latitude, longitude) with the address of the data processing apparatus 10 as a destination address, and sends the service processing request to the relay apparatus 30 (S116). The data relaying unit 301 of the relay apparatus 30 transfers the service processing request to the data processing apparatus 10 (S117).

Upon receiving the service processing request, the service processing control unit 106 of the data processing apparatus 10 determines whether the cooperation processing service provided by the data processing apparatus 10 is usable based on the positional information of the mobile terminal 20 (S118). The processing steps of determining whether the service is usable or unusable by the service processing control unit 106 is explained later with reference to FIG. 13.

Here, when it is determined that the cooperation processing service cannot be used in step S118, the service processing control unit 106 sends an process permission result indicating that the cooperation processing service cannot be used with the address of the mobile terminal 20 as a destination address to the relay apparatus 30 (S119). The data relaying unit 301 of the relay apparatus 30 transfers the process permission result to the mobile terminal 20 (S120). Then, the display control unit 203 outputs the process permission result indicating that the cooperation processing service cannot be used, received by the mobile terminal 20, to the display device 22 to be displayed (S121).

On the other hand, when it is determined that the cooperation processing service is usable in step S118, the service processing control unit 106 performs a predetermined process on a file stored in the folder 114 based on the cooperation processing service selected by the user (S122). For example, when the cooperation processing service selected by the user is "FOLDER TO COLOR PRINT" identified by the service ID "4", the service processing control unit 106 controls the image processing unit 107 to convert a data format of the file to be printed to a data format corresponding to the MFP 40. Then, the service processing control unit 106 sends a service processing request including the processed file to the MFP 40 (S123).

Upon receiving the processed file, that is an object for the cooperation processing service, the MFP 40 performs a predetermined process based on the cooperation processing service on the file (S124). Here, as the "FOLDER TO COLOR PRINT" is selected as the cooperation processing service, the MFP 40 performs a color printing of the file. Then, the MFP 40 responds the completion of the process to the data processing apparatus 10 (S125).

The data processing apparatus 10 sends a service processed result indicating the completion of processing the cooperation processing service with the address of the mobile terminal 20 as a destination address to the relay apparatus 30 (S126). The data relaying unit 301 of the relay apparatus 30 transfers the service processed result to the mobile terminal 20 (S127). Then, in the mobile terminal 20, the display control unit 203 outputs the received service processed result to the display device 22 to be displayed (S128).

(Processing Steps)

Next, the processing steps of determining whether the service is usable or unusable by the service processing control unit 106 of the data processing apparatus 10 performed in step S118 of FIG. 11 is explained in detail.

Figure 13:
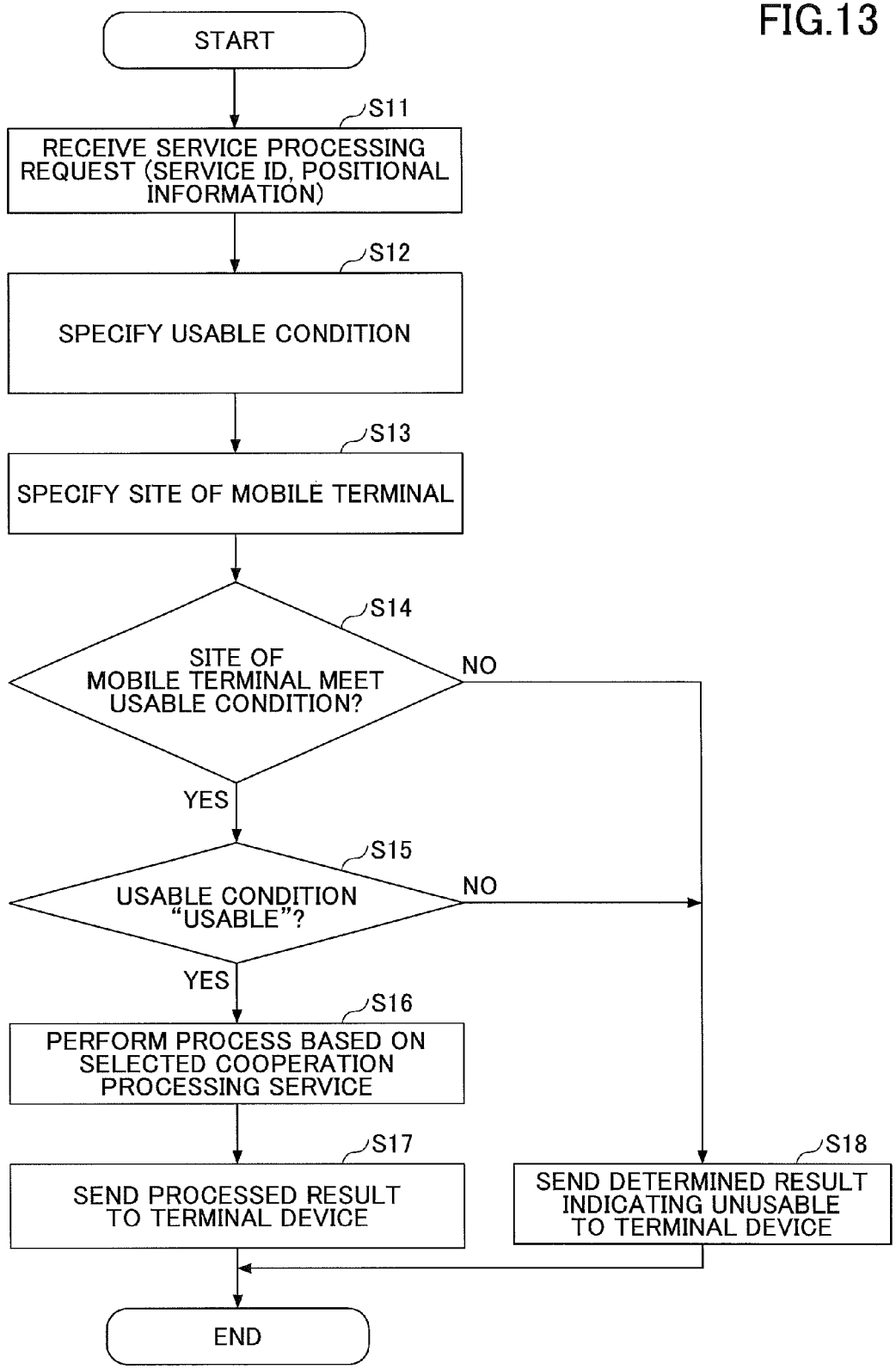
FIG. 13 is a flowchart illustrating an example of processing steps in determining whether a service of the data processing apparatus is usable or unusable, of the embodiment.

FIG. 13 is a flowchart illustrating an example of processing steps in determining whether the service of the data processing apparatus 10 is usable or unusable.

First, the service processing control unit 106 of the data processing apparatus 10 receives the service processing request sent from the mobile terminal 20 (S11). The service processing request includes the service ID of the cooperation processing service and the positional information (latitude, longitude) of the mobile terminal 20.

Next, the service processing control unit 106 specifies the "applied usable condition ID" of the cooperation processing service corresponding to the service ID included in the service processing request based on the service information management DB 1091 (see FIG. 8). Then, the service processing control unit 106 reads out the "usable condition" of the "usable condition ID" corresponding to the specified "applied usable condition ID" based on the usable condition management DB 1101 (see FIG. 9) (S12).

Next, the service processing control unit 106 specifies a site (request source site) of the mobile terminal 20 based on the positional information of the mobile terminal 20 included in the service processing request by referring to the site information management DB 1111 (see FIG. 10) (S13). Specifically, the service processing control unit 106 specifies the site, defined the four edges of the "east end", the "west end", the "south end" and "north end" stored in the site information management DB 1111 as illustrated in FIG. 10, that includes the positional information (latitude, longitude) of the mobile terminal 20 included in the service processing request.

Then, the service processing control unit 106 determines whether the site (request source site) of the mobile terminal 20 specified in step S13 meets the usable condition specified in step S12 (S14).

Here, when it is determined that the request source site meets the usable condition (YES in step S14), the service processing control unit 106 determines whether the usable condition is "usable" or "unusable" (S15). When the usable condition is "usable" (YES in step S15), the service processing control unit 106 preforms the process based on the cooperation processing service corresponding to the service ID included in the service processing request in cooperation with the device (S16). Then, the service processing control unit 106 sends the service processed result of the cooperation processing service to the mobile terminal 20 (S17).

On the other hand, when it is determined that the request source site does not meet the usable condition in step S14 (NO in step S14) or the usable condition is "unusable" in step S15 (NO in step S15), the service processing control unit 106 sends a determined result indicating that the cooperation processing service corresponding to the service ID included in the service processing request is unusable to the mobile terminal 20 (S18).

As described above, according to the cooperation processing system 1 of the embodiment, whether the cooperation processing service is usable or unusable is controlled based on the positional information of the device (mobile terminal 20) requesting to use the cooperation processing service, and the usable condition set for the cooperation processing service. Thus, whether the cooperation processing service is usable or unusable can be controlled in accordance with the position of the device having the communication even in a case where a limitation method such as a packet filtering or the like using address information of the network such as an IP address or the like. Thus, a service with a higher information security can be provided.

Further, according to the cooperation processing system 1 of the embodiment, it is unnecessary to set a limitation condition for each of the devices used in the cooperation processing service, and whether the cooperation processing service is usable or unusable can be controlled at the data processing apparatus 10 side. Thus, the user can set an access control with a simple operation so that it is convenient for the user.

Alternative Example

In an alternative example of the embodiment, whether the cooperation processing service is usable or unusable can be controlled in accordance with the output device or the output destination site used in the cooperation processing service.

Figure 14:
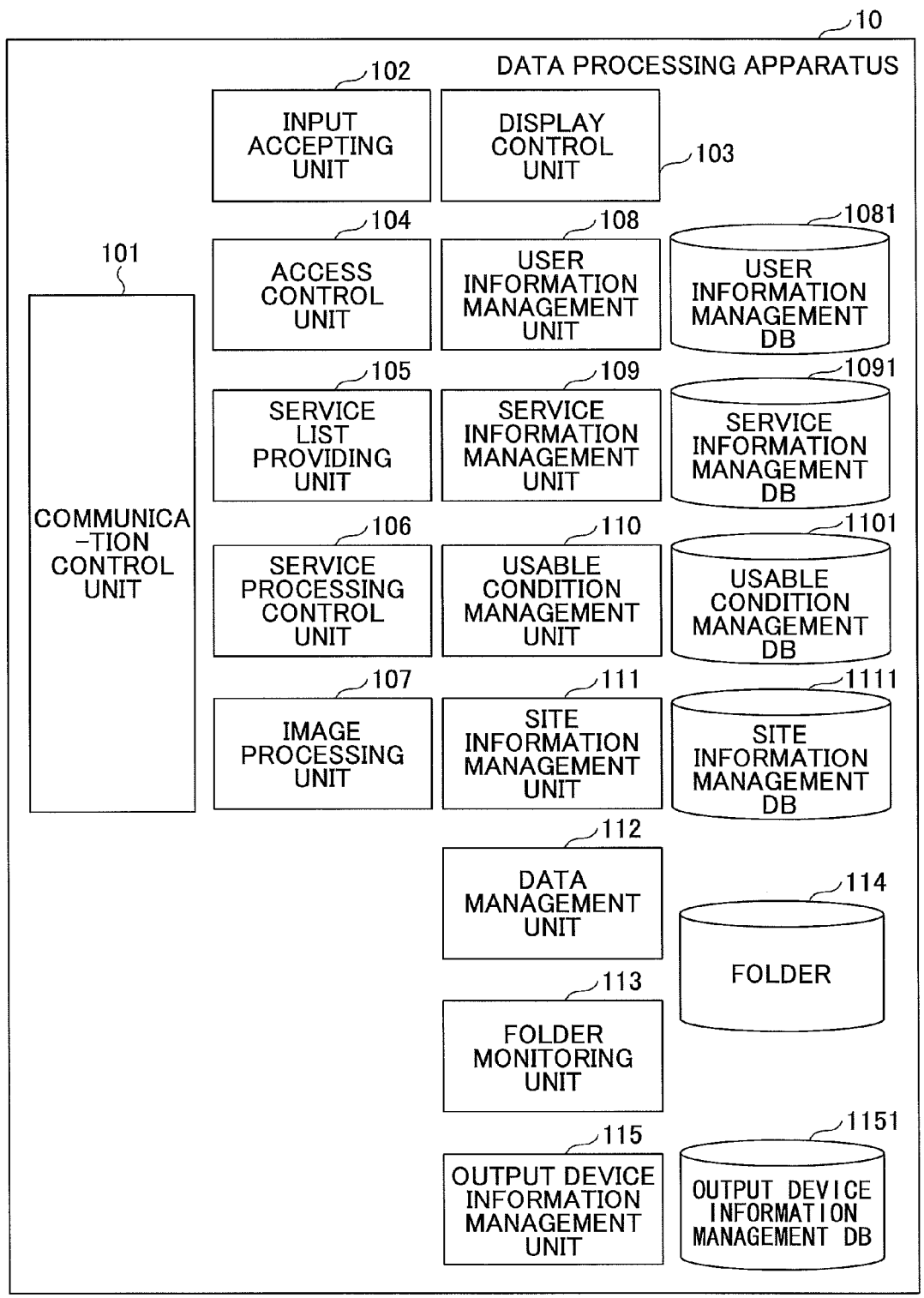
FIG. 14 is a view illustrating an example of a functional structure of the cooperation processing system of an alternative example of the embodiment.

FIG. 14 is a view illustrating an example of a functional structure of the data processing apparatus 10 of an alternative example of the embodiment. Other structures of the cooperation processing system 1 of the embodiment are the same as those explained with reference to FIG. 5, and explanations are not repeated.

In the alternative example, as illustrated in FIG. 14, the data processing apparatus 10 further includes an output device information management unit 115 and an output device information management DB 1151 in addition to the functions illustrated in FIG. 5. Further, in the alternative example, information stored in the usable condition management DB 1101 and a determining process by the service processing control unit 106 to determine whether the service is usable or unusable is different from that explained above in the embodiment.

The output device information management unit 115 manages information regarding an output device (the MFP 40 for the cooperation processing service "FOLDER TO COLOR PRINT" or the projector 50 for the cooperation processing service "FOLDER TO PROJECTOR PROJECTION", for example) used for the cooperation processing service, using the output device information management DB 1151.

FIG. 15 is an example of information stored in the output device information management DB 1151 of the alternative example of the embodiment. As illustrated in FIG. 15, the output device information management DB 1151 stores data items such as "output device ID", "output device name", "output device provided site name" or the like. The "output device ID" is identification information that uniquely identifies the output device. The "output device name" is a name of the output device in the cooperation processing service. The "output device provided site name" is a name of a site where the output device is provided and data is output (print, projection or the like).

Further, the usable condition management DB 1101 of the alternative example includes information illustrated in FIG. 16. FIG. 16 is a view illustrating an example of information stored in the usable condition management DB 1101 of the alternative example of the embodiment. As illustrated in FIG. 16, the usable condition management DB 1101 of the alternative example includes data items such as "request source condition, "output destination condition", "usable/unusable" and the like in correspondence with the "usable condition ID". The "request source condition" is information of a site of the device (mobile terminal 20 or the like) requesting the use of the cooperation processing service. The "output destination condition" is information of a site of the output device or the output destination at which data is output by the cooperation processing service. The "usable/unusable" is information indicating whether the corresponding cooperation processing service is usable or unusable when the "request source condition" and the "output destination condition" are satisfied.

Figure 17:
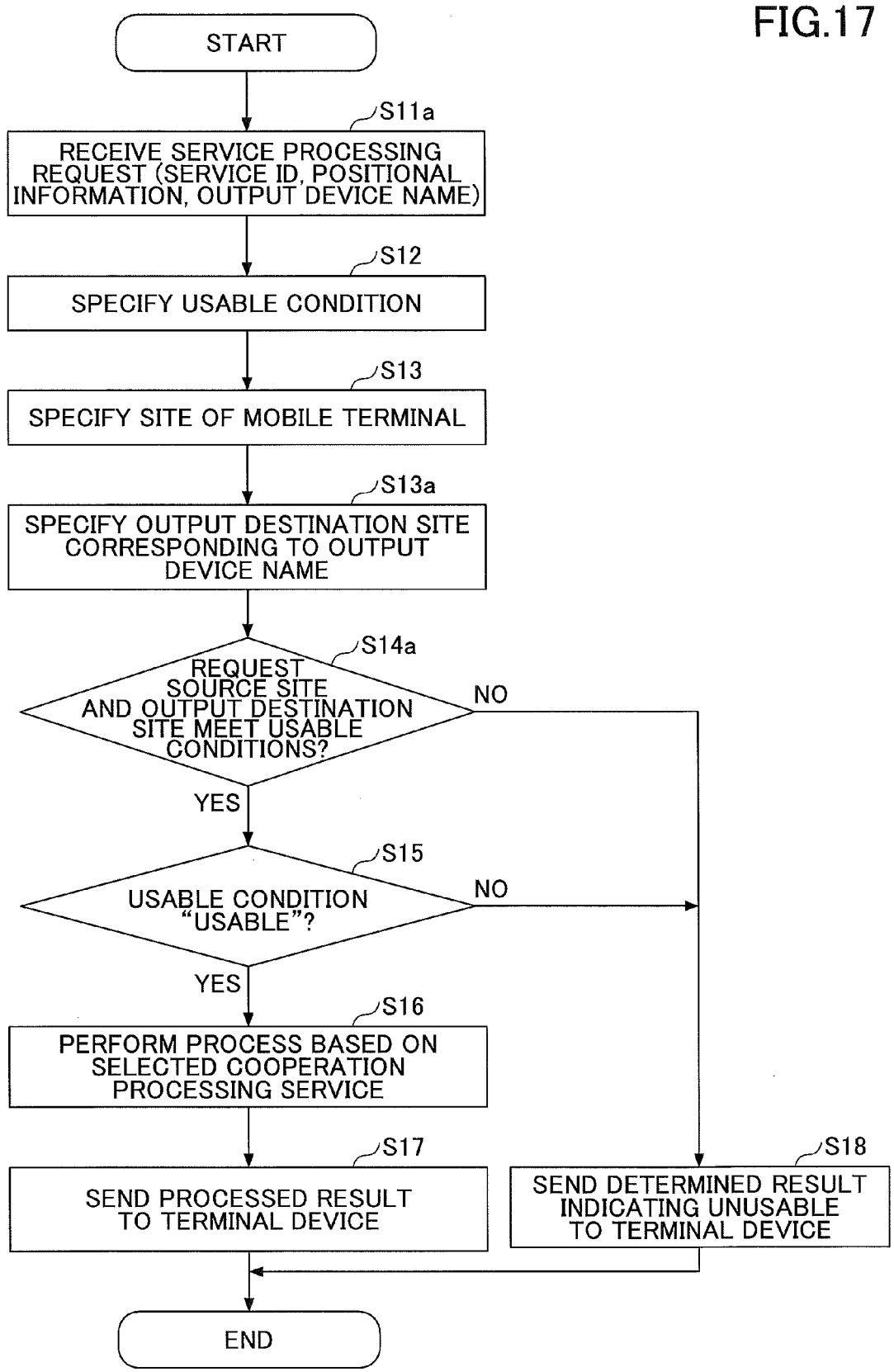
FIG. 17 is a flowchart illustrating an example of processing steps in determining whether the service of the data processing apparatus is usable or unusable, of the alternative example of the embodiment.

Then, the processing steps for determining whether the service is usable or unusable by the data processing apparatus 10 of the alternative example based on the above described functional structure are as illustrated in FIG. 17. FIG. 17 is a flowchart illustrating an example of processing steps in determining whether the service of the data processing apparatus 10 is usable or unusable, of the alternative example of the embodiment. In FIG. 17, same steps are given the same step numbers as those in FIG. 13, and explanations are not repeated.

First, the service processing control unit 106 of the data processing apparatus 10 receives a service processing request including an output device name in addition to the service ID of the cooperation processing service, the positional information of the mobile terminal 20 from the mobile terminal 20 (Slla). The output device name is designated by the user or the mobile terminal 20 in a screen provided by the cooperation processing application program 204. Further, the information designated at the mobile terminal 20 is not limited to the output device name and a site (place) where the output device is provided may be designated.

The service processing control unit 106 refers to the output device information management DB 1151 (see FIG. 15) and specifies the output device provided site name (output destination site name) corresponding to the output device name included in the service processing request (S13a).

Then, the service processing control unit 106 determines whether the request source site specified in step S13 and the received output device name or the output destination site specified in step S13a meet the request source condition and the output destination condition of the usable condition specified in step S12, respectively (S14a). Here, the determination is made on a logical multiplication of the request source condition and the output destination condition. However, alternatively, the determination may be made on a logical sum of the request source condition and the output destination condition, not on the logical multiplication. The processes after step S14a are the same as those explained with reference to FIG. 13.

As described above, according to the cooperation processing system 1 of the alternative example of the embodiment, whether the cooperation processing service can be used is determined based on the position of the device (request source device) requesting the cooperation processing service and the output device or the position of the output device.

With this, even when the request source device and the output device are at different sites, whether the cooperation processing service can be used is determined based on the situation of the site where the output device is positioned. For example, a situation that confidential information is leaked can be prevented even when the request source device is at a site within the own office and the output device is at a site outside the office (company). Thus, the cooperation processing service that corresponds to importance in security in each place can be provided.

Although a preferred embodiment of the cooperation processing system has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

For example, the electronic device used for the cooperation processing service is not limited to the MFP 40 or the projector 50, and an electronic device such as an electronic white board, a monitor or the like may also be used so that various cooperation processing services can be provided. As an example of the process, "FOLDER TO ELECTRONIC WHITE BOARD" by which electronic data stored in the folder is displayed on the electronic white board, "ELECTRONIC WHITE BOARD TO FOLDER" by which data displayed on the electronic white board is stored in the folder, "FOLDER TO MONITOR" by which electronic data stored in the folder is displayed on a monitor and the like may be provided.

Further, a service in which two or more electronic devices are made to cooperate may be provided. For example, "SCAN TO PROJECTOR PROJECTION" by which image data obtained by scanning a document or the like is projected by a projector, "SCAN TO PRINT" by which an image data scanned by a MFP is printed by another MFP and the like may be provided.

According to the present embodiment, whether to use (perform) a predetermined process can be determined based on a position of a terminal requesting to perform the predetermined process.

The individual constituents of the cooperation processing system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

What is claimed is:

1. A data processing apparatus connected to a Local Area Network, comprising:
  a processor; and
  a memory that stores a program and a permitted condition by which a cooperation process is permitted to be performed,
  wherein the cooperation process is a process performed by the data processing apparatus to cause a first process to be performed by a first electronic device to output data to a second electronic device, and to cause a second process performed by the second electronic device to further output data based on the data output from the first electronic device,
  the permitted condition including a first permitted position for a terminal device that requests the data processing apparatus to perform the cooperation process, and a second permitted position for the second electronic device that performs the second process,
  the program including instructions that, when executed, cause the processor
    to accept a request to perform the cooperation process sent from the terminal device,
    to determine whether positions of the terminal device and the second electronic device satisfy the first permitted position and the second permitted position, respectively, and
    to perform the cooperation process based on the request, when it is determined that the positions satisfy the first permitted position and the second permitted position.

2. The data processing apparatus according to claim 1, wherein the cooperation process is SCAN TO PROJECTOR PROJECTION by which image data scanned by the first electronic device is projected by the second electronic device which is a projector, or SCAN TO PRINT by which image data scanned by the first electronic device is printed by the second electronic device which has a print function.

3. The data processing apparatus according to claim 1, wherein the memory stores a plurality of the permitted positions corresponding to a plurality of cooperation processes, respectively.

4. A method of data processing performed by a data processing apparatus connected to a Local Area Network and including a processor and a memory that stores a program and a permitted condition by which a cooperation process is permitted to be performed,
wherein the cooperation process is a process performed by the data processing apparatus to cause a first process to be performed by a first electronic device to output data to a second electronic device, and to cause a second process performed by the second electronic device to further output data based on the data output from the first electronic device,
the permitted condition including a first permitted position for a terminal device that requests the data processing apparatus to perform the cooperation process, and a second permitted position for the second electronic device that performs the second process,
the method comprising:
accepting a request to perform the cooperation process sent from the terminal device,
determining whether positions of the terminal device and the second electronic device satisfy the first permitted position and the second permitted position, respectively, and
performing the cooperation process based on the request, when it is determined that that the positions satisfy the first permitted position and the second permitted position.

5. The data processing apparatus according to claim 4, wherein the cooperation process is SCAN TO PROJECTOR PROJECTION by which image data scanned by the first electronic device is projected by the second electronic device which is a projector, or SCAN TO PRINT by which image data scanned by the first electronic device is printed by the second electronic device which has a print function.

6. A non-transitory computer-readable recording medium having recorded thereon a program including instructions to be executed by a processor of a data processing apparatus,
the data processing apparatus being connected to a Local Area Network and including a memory that stores a permitted condition by which a cooperation process is permitted to be performed,
wherein the cooperation process is a process performed by the data processing apparatus to cause a first process to be performed by a first electronic device to output data to a second electronic device, and to cause a second process performed by the second electronic device to further output data based on the data output from the first electronic device,
the permitted condition including a first permitted position for a terminal device that requests the data processing apparatus to perform the cooperation process, and a second permitted position for the second electronic device that performs the second process,
the instructions, when executed, causing the processor to:
accept a request to perform the cooperation process sent from the terminal device,
determine whether positions of the terminal device and the electronic devices satisfy the first permitted position and the second permitted position, respectively, and
perform the cooperation process based on the request, when it is determined that the positions satisfy the first permitted position and the second permitted position.

7. The non-transitory computer-readable recording medium according to claim 6, wherein the cooperation process is SCAN TO PROJECTOR PROJECTION by which image data scanned by the first electronic device is projected by the the second electronic device which is a projector, or SCAN TO PRINT by which image data scanned by the first electronic device is printed by the second electronic device which has a print function.

* * * * *